No. 115,784

UNITED STATES PATENT OFFICE.

AUGUSTUS HENRY TAIT, OF JERSEY CITY, NEW JERSEY.

IMPROVEMENT IN PRESERVING WOOD.

Specification forming part of Letters Patent No. 115,784, dated June 6, 1871.

I, AUGUSTUS HENRY TAIT, of Jersey City, county of Hudson and State of New Jersey, have invented certain new and useful Improvements in Treating Woody Matters so as to preserve them from decay by dry-rot, from inflammability, and in a great degree from injury by worms.

My improvement consists in charging or saturating the pores of the wood with a concentrated solution of bisulphite of lime or baryta, the same being rendered soluble by excess of sulphurous-acid gas under pressure, or by refrigeration, and being made insoluble as a neutral sulphate when the pressure or excess of gas is removed. The natural affinity of sulphurous acid for the oxygen of the atmosphere is so great that the neutral sulphite is quickly converted by its union with another atom of oxygen into the insoluble sulphate of lime or plaster of Paris—gypsum—in the fibers of the wood, one of the best non-conductors of heat and preservers of woody fiber against fire, while the well-known antiseptic properties of sulphurous acid in all its combinations renders the fiber of the wood completely indestructible from dry-rot.

I am aware that Charles Payne, of England, in his patent of December 29, 1846, describes a method of saturating wood with the sulphuret of lime, made by combining sulphur and lime in a reverberatory furnace, producing what he calls the sulphide of lime. Now, my process is totally different and distinct, being a compound of sulphur and oxygen in the condition of sulphurous acid, consisting of one more atom of oxygen than the sulphide, and which, when united with its combining portion of lime, and an excess of gas, is rendered soluble and limpid, while the use of the sulphuret, from its slight solubility, is not only impracticable, but was abandoned by the inventor.

I use an ordinary furnace for burning sulphur. The resulting gas, being sulphurous acid, is drawn therefrom by a pump and forced into a closed vessel lined with lead, and provided with an agitator. This vessel I charge to about two-thirds its capacity with milk of lime, and the pumping is continued until sufficient gas is absorbed by the lime to form a neutral salt, and the process continued until the lime becomes perfectly limpid, or dissolved as a bisulphite, and at a density of 15° to 20° Baumé, at a temperature of 60° Fahrenheit, when the solution will be ready for use. A second vessel is provided, of any convenient size and shape, capable of sustaining an internal pressure of, say, thirty pounds per square inch, and a vacuum of twenty-five inches of mercury. This being filled with the wood to be treated, and closed, the air therefrom is then withdrawn by a suitable pump until the mercury-gage shows a vacuum of twenty-five inches. The connecting-cock is then opened to the first vessel, and the solution of bisulphite of lime is admitted to the contents until full, when the pressure is raised to, say, five pounds to thirty pounds per square inch, according to circumstances, when the communications may be shut off and the wood lie for saturation an hour or more according to size and nature of wood, when the solution is pumped back and the charge withdrawn, and the oxygen of the air will complete the process.

What I claim, and desire to secure by Letters Patent, is—

The process of preserving wood by means of sulphurous acid combined with a base, in the manner described, and for the purposes set forth.

A. H. TAIT.

Witnesses:
J. B. HYDE,
T. F. GOODRICH.